June 12, 1923.
V. C. KLOEPPER
1,458,136
RELEASING MECHANISM FOR AUTOMOBILE HAND BRAKES AND THE LIKE
Filed May 16, 1921   2 Sheets-Sheet 2
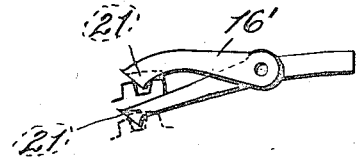
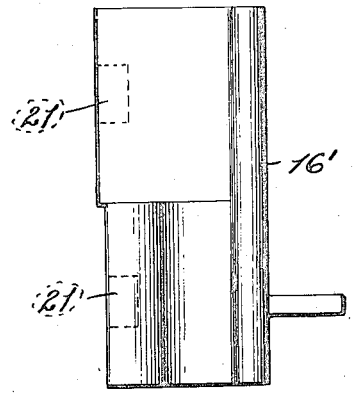
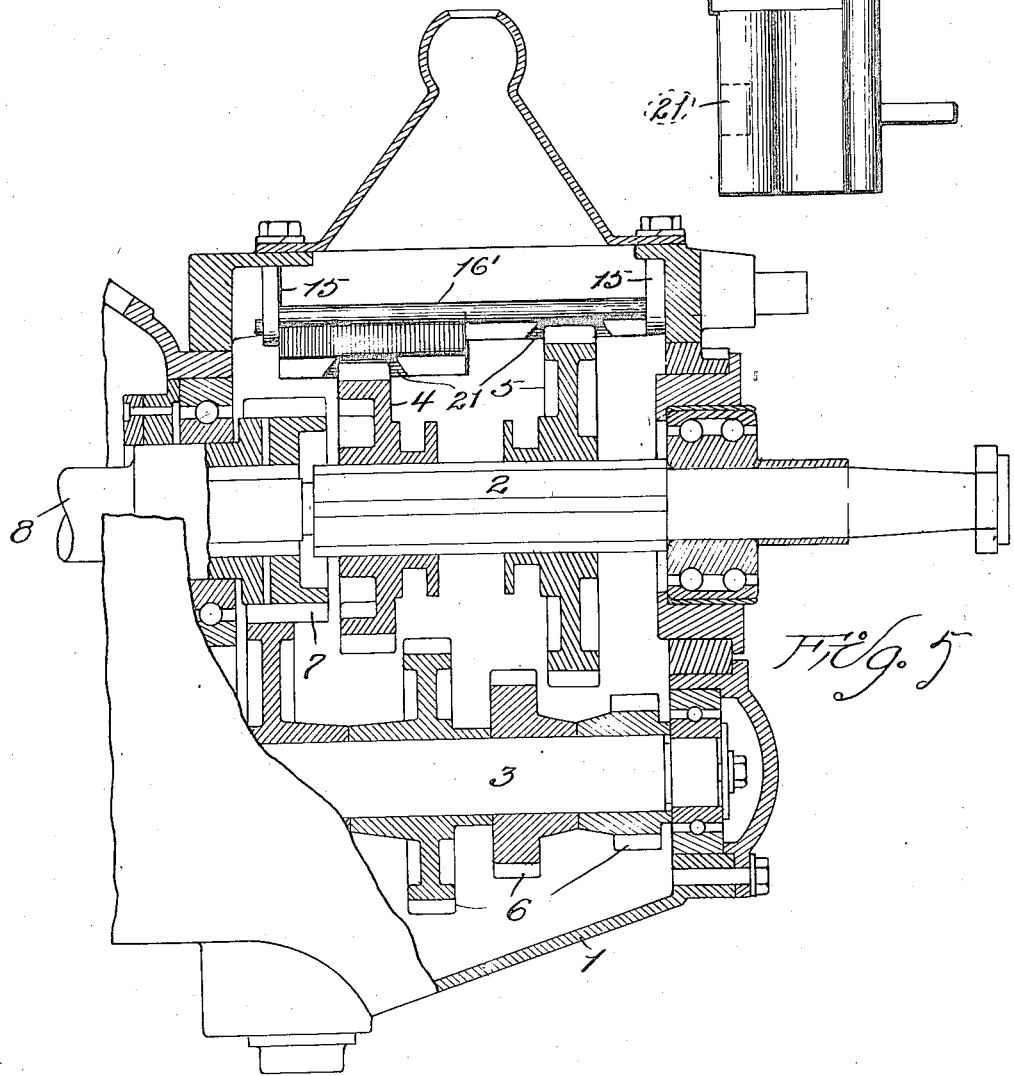
INVENTOR
VALENTINE C. KLOEPPER,
by Ralph ........ ATTORNEY.

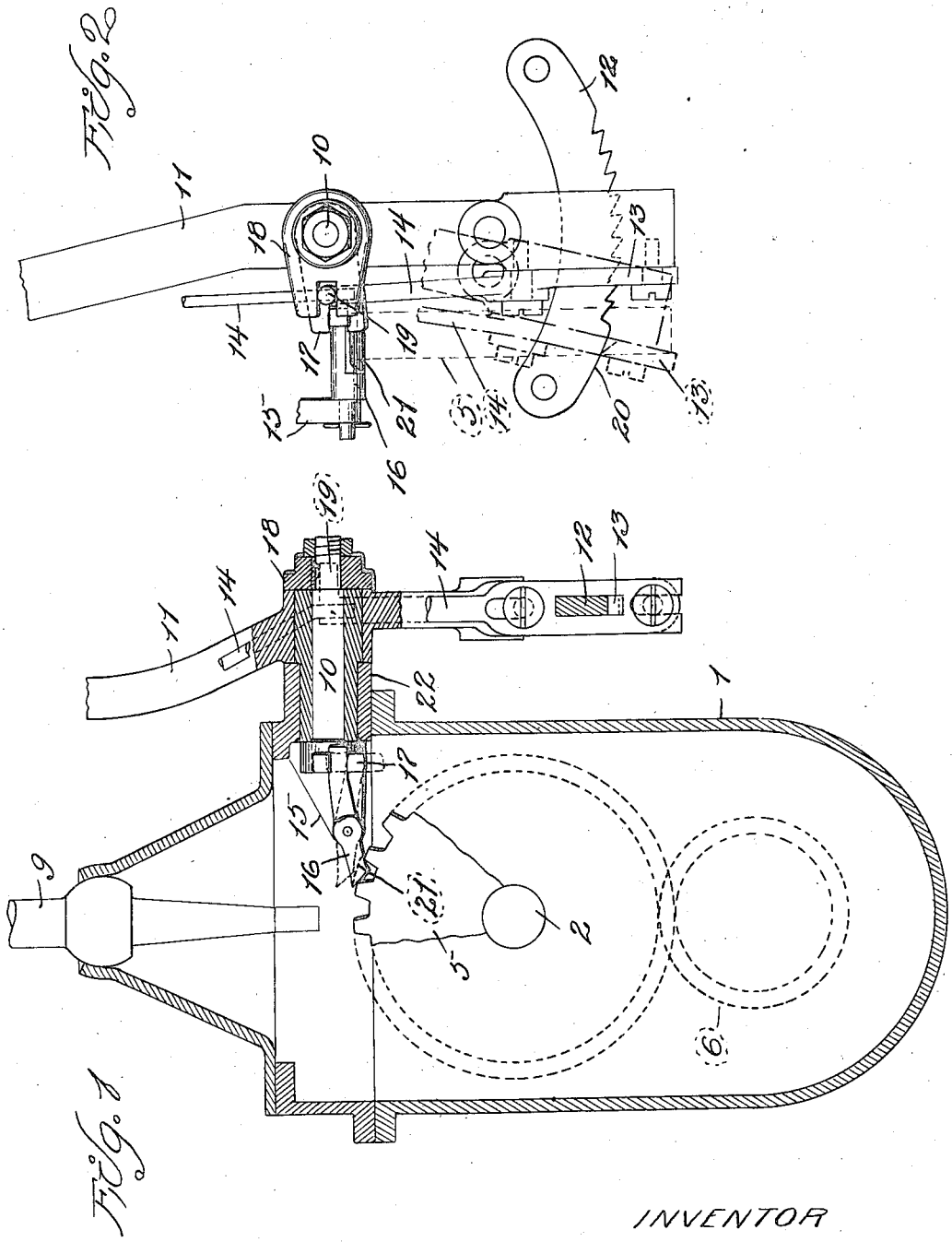

Patented June 12, 1923.

1,458,136

UNITED STATES PATENT OFFICE.

VALENTINE C. KLOEPPER, OF ST. LOUIS, MISSOURI.

RELEASING MECHANISM FOR AUTOMOBILE HAND BRAKES AND THE LIKE.

Application filed May 16, 1921. Serial No. 469,780.

*To all whom it may concern:*

Be it known that I, VALENTINE C. KLOEPPER, a citizen of the United States, residing at the city of St. Louis, State of Missouri, have invented a certain new and useful Releasing Mechanism for Automobile Hand Brakes and the like, of which the following is a specification, reference being had to the accompanying drawings, forming a part thereof.

This invention relates generally to automobiles and, more particularly, to a certain new and useful releasing mechanism for automobile hand-brakes or the like.

It is generally the practice of automobilists to set the hand or so-called emergency-brake when the car is at a stand-still, and it is quite a common occurrence with many drivers to forgetfully omit to release the hand or emergency brake when starting, with the result that a severe and damaging strain is put upon the engine, brake-linings frequently burnt and rendered inefficient, and other more or less expensive repairs often necessitated.

The chief object of my present invention is to obviate such damage or injury to the car and consequent increased cost of upkeep resulting from the oversight or carelessness of the driver in failing to manually release the hand or emergency-brake on starting, and, to that end, to provide the car with means for automatically, and without the intervention or attention of the driver, effecting a release of such brake on starting.

With the above and other objects in view, my present invention resides in the novel features of form, construction, arrangement, and combination of parts hereinafter described and afterwards pointed out in the claims.

In the accompanying drawings,

Figure 1 illustrates in fragmental sectional elevation an automobile transmission-housing, gears, and hand or emergency-brake equipped with a brake-releasing mechanism embodying my invention;

Figure 2 illustrates the hand or emergency brake and the brake-releasing mechanism at a right-angle to Figure 1, the transmission-housing and gears being omitted;

Figure 3 is a detail elevational view of a slightly modified or so-called double pawl or lever forming part of the brake-releasing mechanism;

Figure 4 is a plan view of the gear-engaging pawl or lever of Figure 3; and

Figure 5 illustrates the brake-releasing mechanism embodying the double gear-engaging pawl or lever of Figures 3 and 4 in connection with an automobile transmission-housing and its contained gears shown in section.

Referring now more in detail to the said drawings, which illustrate a practical embodiment of my invention, and in which like reference characters refer to like parts throughout the several views, 1 designates an automobile transmission-housing, 2 the transmission drive-shaft, 3 the counter shaft, 4 the second and high speed gear feathered on shaft 2, 5 the first and reversing gear also feathered on shaft 2, 6 the co-operating first, second, and reverse gears mounted on the counter-shaft 3, 7 the co-operating high or third speed gear integral with clutch shaft 8, and 9 the lever for selectively shifting the gears 4 and 5 into engagement with their co-operating gears, as will be well understood, all said parts being of any standard or approved construction.

Projecting laterally from the housing or casing 1, is a bearing 22, fixed in which is a tubular stub-shaft 10. Mounted for rocking movement on shaft 10 and having suitable operating connection with the band (not shown) of the emergency brake, is the hand or emergency brake-lever 11. Forming part of the emergency brake mechanism, is a suitably fixed toothed sector 12, a pawl 13 carried by lever 11 for co-operative or locking engagement with teeth of sector 12 to set the brake, and a reciprocably shiftable rod 14 carried by lever 11 for releasing or disengaging pawl 13 from the teeth of sector 12 to permit a return of lever 11, under the pull of its retracting spring, not shown, to normal or non-braking position. I might here say that ordinarily, with cars standard upon the market today, on a setting of brake-lever 11, the pawl 13 is held in locking engagement with teeth of sector 12 by a spring, which also I have not shown, and the rod 14 is depressed manually to disengage the pawl 13 from engagement with the sector 12 to permit a rocking or return of lever 11 to normal or non-braking position.

To obviate manual release or disengagement, and to effect automatic release or disengagement, of pawl 13 from teeth of sector 12 to permit lever 11 to return to normal position, I provide the automatic brake-releasing means now to be described.

Fixed within housing 1 are bearings 15, and pivotally mounted intermediate its length on the bearings 15 for rocking co-operation or engagement at its forward end with a selective transmission-gear 5, as in Figure 1, is a rock-lever or pawl 16. Fixed upon the inner end of shaft 10 and engaging the tail end of pawl 16, as best seen in Figures 1 and 2, is a bifurcated or forked lever 17; and fixed upon the other or outer end of shaft 10 is a second bifurcated or forked rock-lever 18, which latter lever has engagement with a stub 19 projecting from rod 14, as best seen in Figure 2. From the construction here described, it will be evident that, when the pawl 16 is rocked or pivotally oscillated, the shaft 10 will be rotarily reciprocated and the shaft or rod 14 consequently longitudinally reciprocated or successively depressed and elevated for co-operating release actuation upon the sector-engaging pawl 13.

It will be noted by referring particularly to Figure 2 that the sector 12 is provided with a cam-surface, as at 20, upon its under face and at its left-hand end, and hence, in use or operation, when the brake-lever 11 is thrown to or in normal or non-braking position, or in the position thereof indicated by dot-and-dash lines in Figure 2, either when the car is running or at a stand-still, the sector cam-surface 20 will so actuate rod 14 to rock the shaft 10, through the engagement of its carried lever 18 with stub 19, to cause its opposite carried lever 17 to shift or elevate the forward-end of pawl 16 out of engagement with the transmission-gear 5, or into the position thereof indicated by dotted lines in Figure 1, and when the forward-end of the pawl 16 is in such raised or elevated position, it will be obvious that the gear 5 may rotate freely without effecting any rocking movement of the pawl 16.

On the car being brought to a stand-still, the gear 5 will be first shifted out of meshing engagement with its co-operating speed or direction gears, or into the non-running position thereof illustrated in Figure 5, and lever 11 then actuated to set the emergency-brake, the pawl 13 being consequently shifted into engagement with teeth of the sector 12. In such movement of the lever 11 and its carried rod 14, the forked levers 17 and 18 will be so actuated or rotarily oscillated as to depress the forward end of the pawl 16 to now engage or ride upon the teeth of gear 5. In order, however, that the pawl 16 may not, when in such depressed engagement with the teeth of gear 5 and with gear 5 in non-running position, interfere or retard a proper setting of the emergency brake and engagement of pawl 13 with teeth of sector 12, the working or forward end of the pawl 16 is cut-away or recessed, as at 21, to freely accommodate the adjacent tooth or teeth of gear 5.

The hand or emergency-brake being now set, the driver in starting his car will necessarily shift gear 5, by means of lever 9, to engage the first speed gear 6 mounted on the countershaft 3, and in such operation, the gear 5 will be shifted out of alignment with the recess 21 of the pawl 16, the forward-end of which is now in full riding engagement with the teeth of gear 5. The driver now starts his car, omitting, however, to release or return the brake 11 to normal or non-braking-position. Consequently, as gear 5 is rotarily actuated, the pawl 16 will be successively engaged and rocked by the teeth of gear 5, the rod 14, by means of the correspondingly rocked levers 17 and 18, successively depressed and elevated, pawl 13, in turn, actuated out of locking engagement with teeth of sector 12, and the lever 11 thus automatically permitted, as gear 5 rotates and as pawl 13 is successively disengaged from the teeth of sector 12, to return, under the pull of its retracting spring, to normal or non-braking position, the pawl 16 being elevated and held out of engagement with the running gear 5 when the lever 11 has returned to full normal or non-braking position, as hereinbefore described.

My new brake-releasing mechanism is simple in form and construction, requires or embodies the installation upon the car of but few additional parts and may hence be readily and inexpensively arranged on cars standard on the market today, and is most efficient in performing its intended functions.

As best seen in Figure 1, the working or forward end of gear-engaging pawl or lever 16 is preferably suitably chamfered or beveled to obviate binding engagement with the teeth of gear 5 either when the same, through actuation of lever 9, is in running mesh with the first speed or reverse gears 6 on countershaft 3.

In Figures 3, 4, and 5, I show the gear-engaging pawl or rock-lever, designated by the reference character 16', integrally doubled, as I may describe, for similar brake-release co-operation with both the transmission-gears 4 and 5; and I am aware that other changes in the form, construction, arrangement, and combination of the several parts of my new brake-releasing mechanism may be made and substituted for those herein shown and described without departing from the nature and principle of my invention.

Having thus described my invention, what I claim and desire to secure by Letters Patent is:

1. In an automobile, a pivoted brake-lever, means for locking the brake in set or braking position, and the transmission, in combination with means for automatically effecting a release of the brake-lever from set or braking position upon movement of the transmission.

2. In an automobile, a pivoted brake-lever, means for locking the brake in set or braking position, and the transmission, in combination with means operable by and upon movement of the transmission for automatically effecting a release of the brake-lever from set or braking position.

3. In an automobile, a pivoted brake-lever, means including a toothed sector and a pawl adapted for engagement with the sector for locking the lever in set or braking position, and a transmission gear, in combination with means including a member adapted for actuation by the gear when rotating for automatically effecting disengagement of the pawl from the teeth of the sector to permit the lever to return to normal or non-braking position.

4. In an automobile, a pivoted brake-lever, means including a toothed sector and a pawl adapted for engagement with the sector for locking the lever in set or braking position, and a transmission-gear, in combination with means for automatically upon rotary actuation of the gear effecting disengagement of the pawl from the teeth of the sector to permit the lever to return to normal or non-braking position, said means including a shiftable pawl-engaging rod, and a rocking-lever adapted for actuation by the gear when rotating for automatically shifting said rod.

5. In an automobile, a pivoted brake-lever, means including a toothed sector and a pawl adapted for engagement with the sector for locking the lever in set or braking position, and a transmission gear, in combination with means for automatically upon rotary actuation of the gear effecting disengagement of the pawl from the teeth of the sector to permit the lever to return to normal or non-braking position, said means including a stub shaft, a pair of forked rock-levers fixed on the shaft, a shiftable rod adapted for engagement with the pawl, a stub on the rod having engagement with one of said rock-levers, and a pivoted lever-pawl having engagement with the other rock-lever and adapted for rocking-actuation by the gear when rotating.

6. In an automobile, a pivoted brake-lever, means including a toothed sector and a pawl adapted for engagement with teeth of the sector for locking the lever in set or braking position, and a manipulative element for effecting disengagement of the pawl from the sector to permit the lever to return to normal non-braking position, in combination with the transmission, means including a rock-lever adapted for engagement with and operable by the transmission when rotating for automatically effecting movement of said element to disengage the pawl from the sector, and means for elevating the rock-lever out of engagement with the transmission when the brake-lever is in normal non-braking position.

7. In an automobile, a pivoted brake-lever, means including a toothed sector and a pawl adapted for engagement with teeth of the sector for locking the lever in set or braking position, and a manipulative element for effecting disengagement of the pawl from the sector to permit the lever to return to normal non-braking position, in combination with the transmission, means including a rock-lever adapted for engagement with and operable by the transmission when rotating for automatically effecting movement of said element to disengage the pawl from the sector, and a cam on the sector adapted through said element to elevate the rock-lever out of engagement with the transmission when the brake-lever is in normal non-braking position.

In witness whereof, I have signed my name to this specification.

VALENTINE C. KLOEPPER.